US009518594B1

(12) United States Patent
Liao et al.

(10) Patent No.: US 9,518,594 B1
(45) Date of Patent: Dec. 13, 2016

(54) HYDRAULIC FLUID HEAT DISSIPATION CONTROL ASSEMBLY AND METHOD

(75) Inventors: Jianmin Liao, Bothell, WA (US); Robert M. Thomas, Renton, WA (US)

(73) Assignee: The Boeing Company, Chicago, IL (US)

( * ) Notice: Subject to any disclaimer, the term of this patent is extended or adjusted under 35 U.S.C. 154(b) by 1263 days.

(21) Appl. No.: 13/460,763

(22) Filed: Apr. 30, 2012

(51) Int. Cl.
*F15B 21/04* (2006.01)
*B64C 13/40* (2006.01)

(52) U.S. Cl.
CPC ............. *F15B 21/042* (2013.01); *B64C 13/40* (2013.01); *F15B 21/041* (2013.01)

(58) Field of Classification Search
CPC ............................. F15B 21/042; F15B 21/041
See application file for complete search history.

(56) References Cited

U.S. PATENT DOCUMENTS 2,683,348 A * 7/1954 Petry ......................... F02K 1/15 60/238
3,699,847 A * 10/1972 Little .................... F15B 21/042 244/99.5
5,535,711 A 7/1996 Kach
5,709,085 A * 1/1998 Herbig .................... E02F 9/226 60/456
5,899,067 A 5/1999 Hageman
5,916,140 A 6/1999 Hageman
6,129,056 A 10/2000 Skeel et al.
6,269,872 B1 8/2001 Anderson
6,732,791 B2 5/2004 Buysse et al.
6,939,392 B2 9/2005 Huang et al.
7,267,085 B2 9/2007 Joyce et al.
7,520,465 B2 4/2009 Mahjoub
7,984,606 B2 7/2011 Smith
8,080,909 B2 12/2011 Perkins
8,127,541 B2 3/2012 Satake
2010/0170238 A1* 7/2010 Behr ....................... B64C 13/40 60/459
2011/0173965 A1* 7/2011 Holmes ............... F16H 61/0031 60/456

* cited by examiner

*Primary Examiner* — F. Daniel Lopez

(57) ABSTRACT

There is provided in an embodiment a hydraulic fluid heat dissipation control assembly for an aircraft hydraulic system. The hydraulic fluid heat dissipation control assembly has one or more heat exchangers. The hydraulic fluid heat dissipation control assembly further has at least one flow control element coupled to the one or more heat exchangers to control flow and heat dissipation of a hydraulic fluid. There is also provided a method of controlling heat dissipation of a hydraulic fluid in an aircraft hydraulic system using the hydraulic fluid heat dissipation control assembly disclosed herein.

27 Claims, 6 Drawing Sheets

HYDRAULIC FLUID HEAT DISSIPATION CONTROL ASSEMBLY AND METHOD

BACKGROUND

1) Field of the Disclosure

The disclosure relates generally to assemblies and methods for hydraulic systems, and more specifically, to assemblies and methods for controlling hydraulic fluid temperature in hydraulic systems, such as an aircraft hydraulic system.

2) Description of Related Art

Aircraft hydraulic systems may be used to provide power for various operating components of an aircraft, such as wing flaps, thrust reversers, flight control surfaces, and landing gear mechanisms. Large, multi-engine aircraft may have several independent hydraulic systems. For example, two engine aircraft may have three hydraulic systems and four engine aircraft may have four hydraulic systems. Such aircraft hydraulic systems typically include engine driven or electrically driven pump devices mounted on each of the multiple engines. The pump devices pump hydraulic fluid through the aircraft hydraulic system at a high pressure. Aircraft typically operate at a pressure of 3000 psi (pounds per square inch), and some military aircraft and other aircraft may operate at a pressure of 5000 psi. Moreover, aircraft hydraulic systems for large, multi-engine aircraft may generate excess heat from the pump devices, such as in hot weather operations or conditions, which, in turn, may increase the temperature of the hydraulic fluid. Further, cold weather operations or conditions may decrease the temperature of the hydraulic fluid. Overheated hydraulic fluid, as well as hydraulic fluid that is not warm enough, may limit or restrict operation of the aircraft hydraulic system.

Known devices and methods exist for controlling the hydraulic fluid temperature in aircraft hydraulic systems. One such known device and method includes use and installation of a single fixed effect heat exchanger in an aircraft hydraulic system, such as, for example, in an aircraft fuel tank. However, for cold weather operations or conditions that require the hydraulic fluid be warmed up, use of such a heat exchanger may remove too much heat and may result in a cold hydraulic fluid that may be too cold to satisfy the required performance. Thus, operational restrictions and/or additional warm-up procedures may be required for cold weather operations. In some cases, design changes to the aircraft hydraulic systems may be required to up-size the hydraulic tubing and components in order to meet the requirement of hydraulic performance in cold weather conditions. Such increased size of the hydraulic tubing and components, in turn, may increase the overall weight of the aircraft which may result in a weight penalty and increased fuel costs.

Another known device and method includes use and installation of one or more thermostat control valves in an aircraft hydraulic system. However, such known thermostat control valves may require a thermal actuator which may be expensive, unreliable and may require a long lead time to develop. Moreover, such known thermostat control valves may not be capable of controlling heat dissipation based on a running condition of the pump device.

Accordingly, there is a need in the art for improved devices, assemblies, and methods for hydraulic fluid temperature or heat dissipation control in aircraft hydraulic systems that provide advantages over known devices, assemblies, and methods.

SUMMARY

This need for improved devices, assemblies, and methods for hydraulic fluid temperature or heat dissipation control in aircraft hydraulic systems is satisfied. As discussed in the below detailed description, embodiments of assemblies and methods may provide significant advantages over existing devices, assemblies, and methods.

In an embodiment of the disclosure, there is provided a hydraulic fluid heat dissipation control assembly for an aircraft hydraulic system. The hydraulic fluid heat dissipation control assembly has one or more heat exchangers. The hydraulic fluid heat dissipation control assembly further has at least one flow control element coupled to the one or more heat exchangers to control flow and heat dissipation of a hydraulic fluid.

In another embodiment of the disclosure, there is provided an aircraft having an aircraft hydraulic system with a hydraulic fluid heat dissipation control assembly. The aircraft comprises a fuselage, a pair of wings operatively coupled to the fuselage, and one or more aircraft hydraulic systems disposed within at least one of the fuselage and the pair of wings. Each aircraft hydraulic system comprises a hydraulic fluid heat dissipation control assembly. The hydraulic fluid heat dissipation control assembly comprises at least one fluid flow line. The hydraulic fluid heat dissipation control assembly further comprises one or more pump devices coupled to the at least one fluid flow line. The hydraulic fluid heat dissipation control assembly further comprises one or more heat exchangers coupled to the at least one fluid flow line. The hydraulic fluid heat dissipation control assembly further comprises at least one pressure control valve coupled to the at least one fluid flow line to control flow and heat dissipation of a hydraulic fluid from the one or more pump devices through the at least one fluid flow line and through the one or more heat exchangers in order to obtain a heat dissipation controlled hydraulic fluid which then flows to a return flow line or to a hydraulic fluid reservoir both located in the aircraft hydraulic system.

In another embodiment of the disclosure, there is provided a method of controlling heat dissipation of a hydraulic fluid in an aircraft hydraulic system. The method comprises installing a hydraulic fluid heat dissipation control assembly in an aircraft hydraulic system. The hydraulic fluid heat dissipation control assembly comprises at least one fluid flow line positioned in the aircraft hydraulic system. The hydraulic fluid heat dissipation control assembly further comprises one or more pump devices coupled to the at least one fluid flow line. The hydraulic fluid heat dissipation control assembly further comprises one or more heat exchangers coupled to the at least one fluid flow line. The hydraulic fluid heat dissipation control assembly further comprises at least one flow control element coupled to the at least one fluid flow line. The method further comprises sensing with the at least one flow control element a pressure differential across one of the one or more heat exchangers. The method further comprises controlling with the at least one flow control element the flow of the hydraulic fluid through the one or more heat exchangers so as to vary heat dissipation from the aircraft hydraulic system and so as to obtain a heat dissipation controlled hydraulic fluid. The method further comprises flowing the heat dissipation controlled hydraulic fluid to one of at least a return flow line or to a hydraulic fluid reservoir both in the aircraft hydraulic system.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
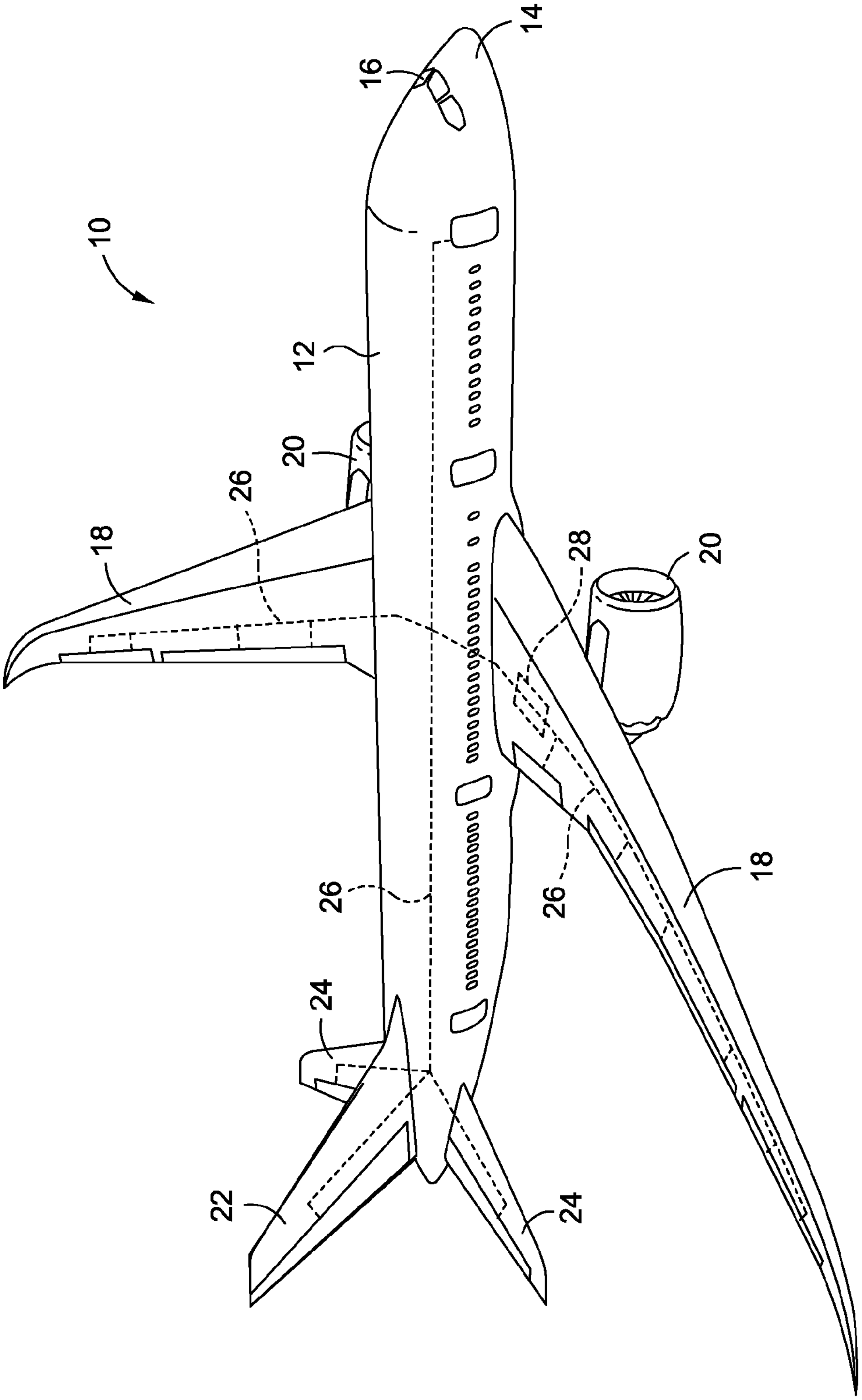
FIG. 1 is an illustration of a perspective view of an aircraft with an aircraft hydraulic system incorporating an exemplary embodiment of a hydraulic fluid heat dissipation control assembly of the disclosure.

Now referring to the Figures, FIG. 1 is an illustration of a perspective view of an aircraft 10 with an aircraft hydraulic system 26 incorporating an exemplary embodiment of a hydraulic fluid heat dissipation control assembly 28 of the disclosure. As shown in FIG. 1, the aircraft 10 comprises a fuselage 12, a nose 14, a cockpit 16, a pair of wings 18 operatively coupled to the fuselage 12, one or more engines 20, a vertical tail portion 22, and horizontal tail portions 24. Although the aircraft 10 shown in FIG. 1 is generally representative of a commercial passenger aircraft having a hydraulic fluid heat dissipation control assembly 28, the teachings of the disclosed embodiments may be applied to other passenger aircraft, cargo aircraft, military aircraft, and other types of aircraft or aerial vehicles.

Figure 2:
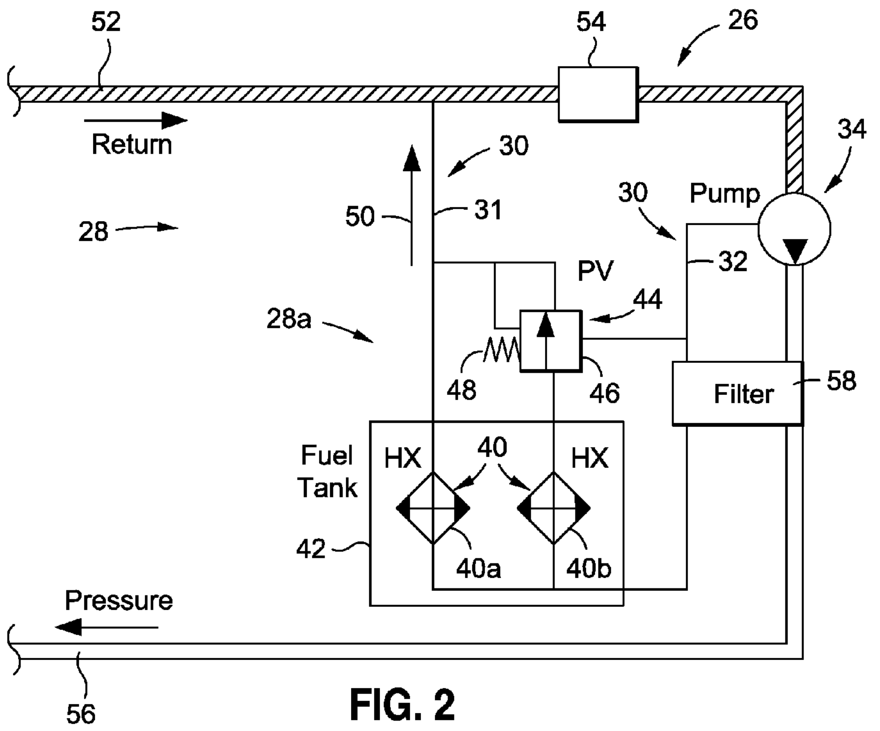
FIG. 2 is an illustration of a schematic diagram of one of the embodiments of a hydraulic fluid heat dissipation control assembly of the disclosure.
Figure 4:
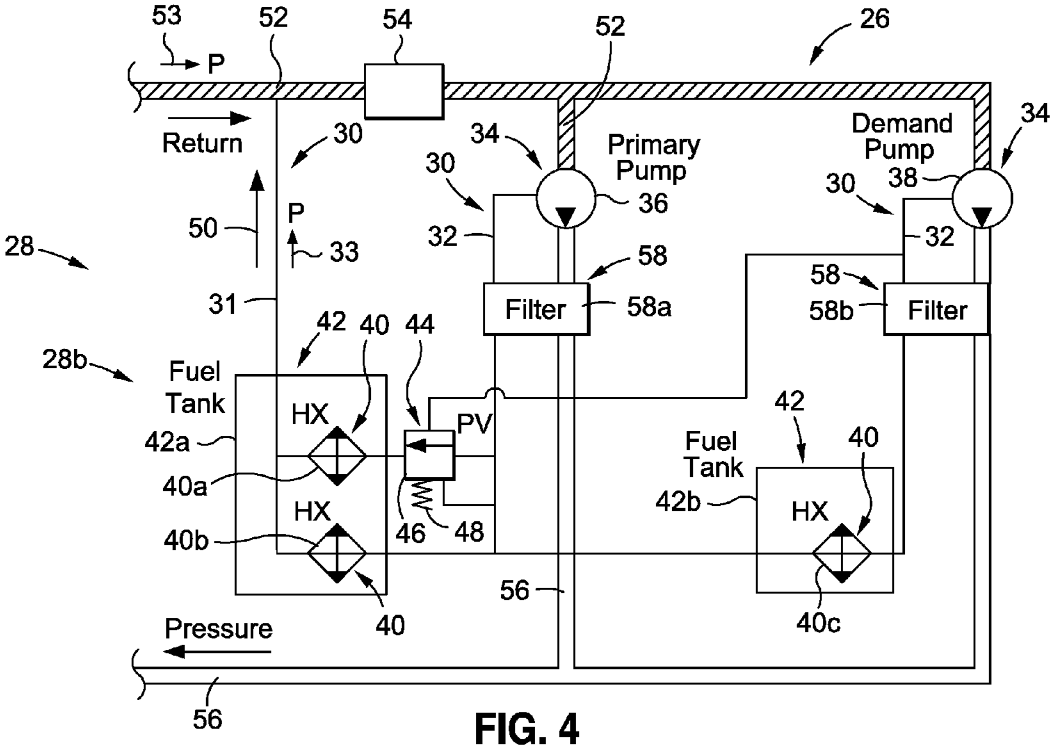
FIG. 4 is an illustration of a schematic diagram of another one of the embodiments of a hydraulic fluid heat dissipation control assembly of the disclosure for an aircraft hydraulic system.
Figure 5:
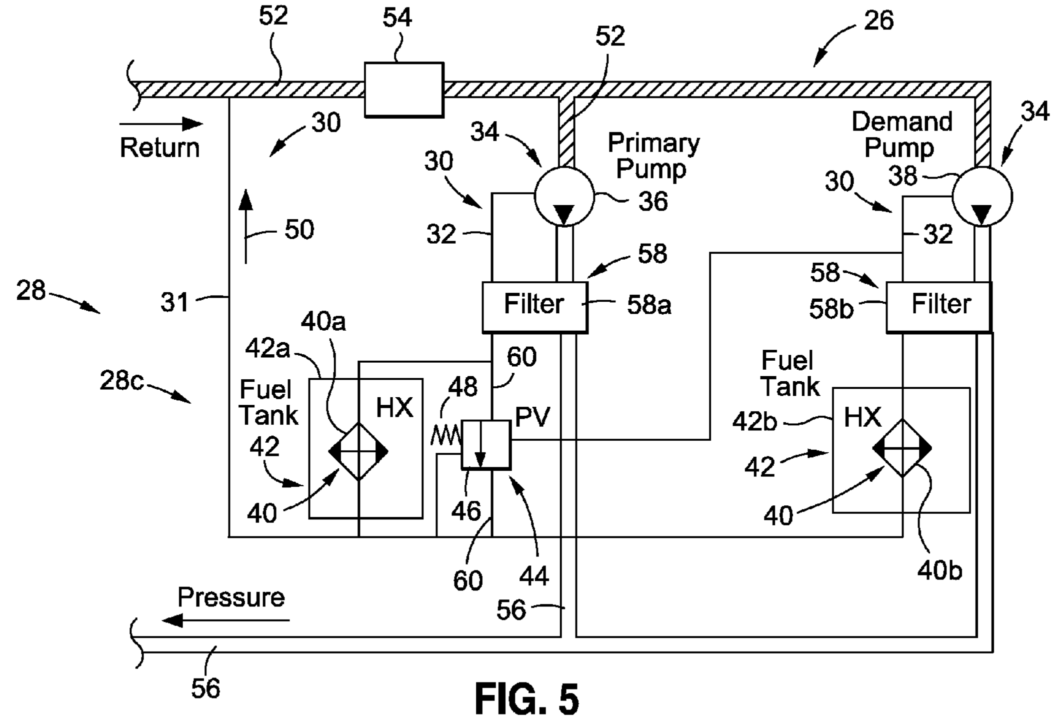
FIG. 5 is an illustration of a schematic diagram of yet another one of the embodiments of a hydraulic fluid heat dissipation control assembly of the disclosure.

FIG. 2 is an illustration of a schematic diagram of one of the embodiments of a hydraulic fluid heat dissipation control assembly 28, such as in the form of a hydraulic fluid heat dissipation control assembly 28*a*, for an aircraft hydraulic system 26. FIG. 4 is an illustration of a schematic diagram of another one of the embodiments of a hydraulic fluid heat dissipation control assembly 28, such as in the form of a hydraulic fluid heat dissipation control assembly 28*b*, for an aircraft hydraulic system 26. FIG. 5 is an illustration of a schematic diagram of yet another one of the embodiments of a hydraulic fluid heat dissipation control assembly 28, such as in the form of a hydraulic fluid heat dissipation control assembly 28*c*, for an aircraft hydraulic system 26.

As shown in FIGS. 2, 4, and 5, there is provided a hydraulic fluid heat dissipation control assembly 28 for an aircraft hydraulic system 26. The hydraulic fluid heat dissipation control assembly 28 may comprise at least one fluid flow line 30 (see FIGS. 2, 4, 5) positioned in an aircraft hydraulic system 26. The at least one fluid flow line 30 preferably comprises a case drain flow line 31 (see FIGS. 2, 4, 5). The at least one fluid flow line 30, in the form of case drain line 31, carries hydraulic fluid 32 (see FIGS. 2, 4, 5) from one or more pump devices 34 (see FIGS. 2, 4, 5) to a return line 52 (see FIGS. 2, 4, 5) and to a hydraulic fluid reservoir 54 (see FIGS. 2, 4, 5). The case drain flow line 31 takes away heat from the one or more pump devices 34. The temperature of the hydraulic fluid 32 in the case drain flow line 31 may be 20° F. to 50° F. higher than the temperature of the hydraulic fluid entering the pump device 34 from the hydraulic fluid reservoir 54.

The hydraulic fluid heat dissipation control assembly 28 may further comprise one or more pump devices 34 (see FIGS. 2, 4, 5) coupled to the at least one fluid flow line 30. The one or more pump devices 34 may comprise, for example, one or more primary pump devices 36 (see FIGS. 4, 5), one or more demand pump devices 38 (see FIGS. 4, 5), or another suitable pump device 34. Preferably, the one or more pump devices 34 are hydraulic pump devices or another suitable type of pump device. FIG. 2 shows one pump device 34 which may comprise either one primary pump device 36 or one demand pump device 38. Alternatively, the hydraulic fluid heat dissipation control assembly 28 of FIG. 2 may comprise two pump devices 34, such as one primary pump device 36 and one demand pump device 38. FIGS. 4 and 5 show two pump devices 34 comprising one primary pump device 36 and one demand pump device 38. The one or more pump devices 34 may be powered or driven by the one or more engines 20 (see FIG. 1), may be electrically powered or driven, or may be powered or driven by another suitable source or means.

As shown in FIGS. 2, 4, and 5, the hydraulic fluid heat dissipation control assembly 28 comprises one or more heat exchangers 40 (HX). The one or more heat exchangers 40 may be coupled to the at least one fluid flow line 30. The one or more heat exchangers 40 are preferably located in one or more fuel tanks 42, for example, either together in one fuel tank 42 or separately in two or more fuel tanks 42. In one embodiment, as shown in FIG. 2, the hydraulic fluid heat dissipation control assembly 28 may have two (2) heat exchangers 40 (HX), such as heat exchanger 40*a* and heat exchanger 40*b* positioned in parallel to each other in one fuel tank 42.

In another embodiment, as shown in FIG. 5, the hydraulic fluid heat dissipation control assembly 28 may have two heat exchangers 40 (HX), such as heat exchanger 40*a* and heat exchanger 40*b*, positioned in parallel to each other with one heat exchanger 40*a* located in one fuel tank 42, such as fuel tank 42*a*, and with another heat exchanger 40*b* located in another fuel tank 42, such as fuel tank 42*b*, which is separate from fuel tank 42*a*.

In another embodiment, as shown in FIG. 4, the hydraulic fluid heat dissipation control assembly 28 may have three heat exchangers 40 (HX), such as heat exchanger 40*a*, heat exchanger 40*b*, and heat exchanger 40*c*, with two of the three heat exchangers 40 positioned in parallel to each other. As shown in FIG. 4, heat exchanger 40*a* and heat exchanger 40*b* are positioned in parallel to each other in one fuel tank 42, such as fuel tank 42*a*, and heat exchanger 40*c* is located in another separate fuel tank 42, such as fuel tank 42*b*, separate from fuel tank 42*a*. Preferably, the heat exchangers 40 used are the same or similar types of known heat exchangers used in aircraft hydraulic systems.

As shown in FIGS. 2, 4, and 5, the hydraulic fluid heat dissipation control assembly 28 further comprises at least one flow control element 44 coupled to the one or more heat exchangers 40 to control flow and heat dissipation of a hydraulic fluid 50 (see FIGS. 2, 4, 5). Preferably, the at least one flow control element 44 comprises a pressure control valve 46 (see FIGS. 2, 4, 5). FIGS. 2, 4, and 5 each show one flow control element 44 in the form of a pressure control valve 46. However, additional flow control elements 44 may also be used. Preferably, for additional heat exchangers 40 greater than three heat exchangers, an additional flow control element 44, such as in the form of pressure control valve 46, may be used. Preferably, the pressure control valves 46 used are suitable known pressure control valves.

The at least one flow control element 44, such as in the form of pressure control valve 46, preferably controls the flow and heat dissipation of the hydraulic fluid 32 (see FIGS. 2, 4, 5) that flows from the one or more pump devices 34 through the at least one fluid flow line 30 and through the one or more heat exchangers 40 in order to obtain a heat dissipation controlled hydraulic fluid 50 (see FIGS. 2, 4, 5). The heat dissipation controlled hydraulic fluid 50 may then flow to a return flow line 52 (see FIGS. 2, 4, 5) or to a hydraulic fluid reservoir 54 (see FIGS. 2, 4, 5). The return flow line 52 and the hydraulic fluid reservoir 54 are both located in the aircraft hydraulic system 26. The hydraulic fluid reservoir 54 is preferably at a low pressure, such as 50 psi (pounds per square inch).

As shown in FIGS. 2, 4 and 5, the hydraulic fluid heat dissipation control assembly 28 may further comprise a pressure line 56 coupled to the return flow line 52 via the one or more pump devices 34. The pressure line 56 is preferably at a high pressure, such as 3000 psi (pounds per square inch) or 5000 psi. The hydraulic fluid heat dissipation control assembly 28 may further comprise one or more filters 58 (see FIGS. 2, 4, 5) for filtering and cleaning the hydraulic fluid 32 and removing impurities in the aircraft hydraulic system 26 and in the hydraulic fluid reservoir 54. Thus, each aircraft hydraulic system 26 preferably has one or more pump devices 34, and more preferably has a primary pump device 36 and a demand pump device 38. Each pump device 34 has ports for the return flow line 52 (also referred to as a supply flow line), the pressure line 56, and the case drain flow line 31.

Embodiments of the hydraulic fluid heat dissipation control assembly 28 disclosed herein advantageously control heat dissipation of the hydraulic fluid 32 in the aircraft hydraulic system 26, in order to condition the hydraulic fluid 32 to maintain an optimum hydraulic fluid temperature, such that the hydraulic fluid 32 is preferably not overheated for hot day operations or conditions, and such that the hydraulic fluid 32 preferably retains heat to maintain a warmer hydraulic fluid temperature in the aircraft hydraulic system 26, so as to ensure adequate hydraulic performance for cold day operations or conditions. Thus, the hydraulic fluid heat dissipation control assembly 28 disclosed herein advantageously helps to maintain an ideal hydraulic fluid temperature range for both hot day and cold day operations or conditions.

As shown in FIG. 2, in one embodiment, the hydraulic fluid heat dissipation control assembly 28, such as hydraulic fluid heat dissipation control assembly 28*a*, has one flow control element 44, such as in the form of pressure control valve 46, and has two heat exchangers 40, such as heat exchanger 40*a* (HX) and heat exchanger 40*b* (HX). The two heat exchangers 40*a*, 40*b*, are positioned in parallel to each other in a fuel tank 42. The hydraulic fluid heat dissipation control assembly 28 preferably has one flow control element, such as in the form of pressure control valve 46, positioned in line with one of the two heat exchangers 40 that are positioned in parallel to each other. As shown in FIG. 2, the flow control element 44, such as in the form of pressure control valve 46, is positioned in line with heat exchanger 40*b*. The pressure control valve 46 preferably senses a pressure differential across the filter 58 (see FIG. 2) and the two heat exchangers 40*a*, 40*b* in order to control flow of the hydraulic fluid 32 through the two heat exchangers 40*a*, 40*b*, so as to control heat dissipation from the aircraft hydraulic system 26. The pressure control valve 46 controls the connection and disconnection of the heat exchanger 40*b* that is in line with the pressure control valve 46, and the other heat exchanger 40*a* is preferably open. The pressure differential sensed by the pressure control valve 46 may vary with a temperature of the hydraulic fluid 32.

Figure 6:
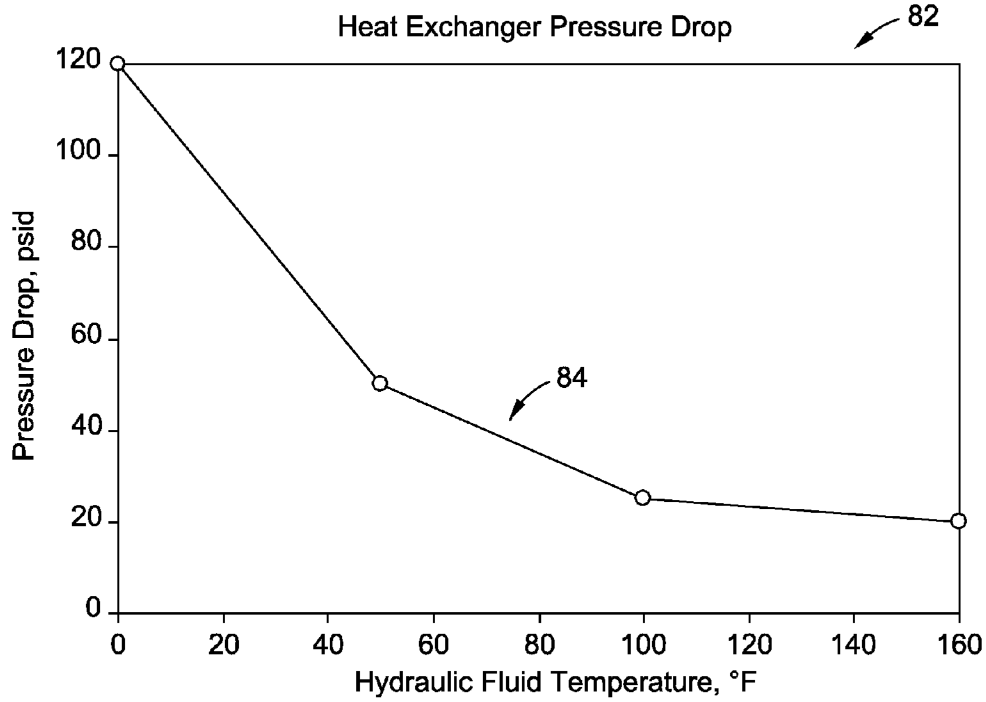
FIG. 6 is an illustration of a heat exchanger pressure drop graph showing pressure drop versus hydraulic fluid temperature.

FIG. 6 is an illustration of a heat exchanger pressure drop graph 82 showing pressure drop psid (pounds per square inch differential) versus hydraulic fluid temperature in ° F. (degrees Fahrenheit). FIG. 6 shows a hydraulic fluid temperature-pressure drop measurements plot line 84 indicating that as the hydraulic fluid temperature increases, the pressure drop decreases, and as the hydraulic fluid temperature decreases, the pressure drop increases. For example, as shown in FIG. 6, at a hydraulic fluid temperature of about 50° F., the pressure drop is about 50 psid, whereas at a hydraulic fluid temperature of 100° F., the pressure drop is about 25 psid.

Figure 7:
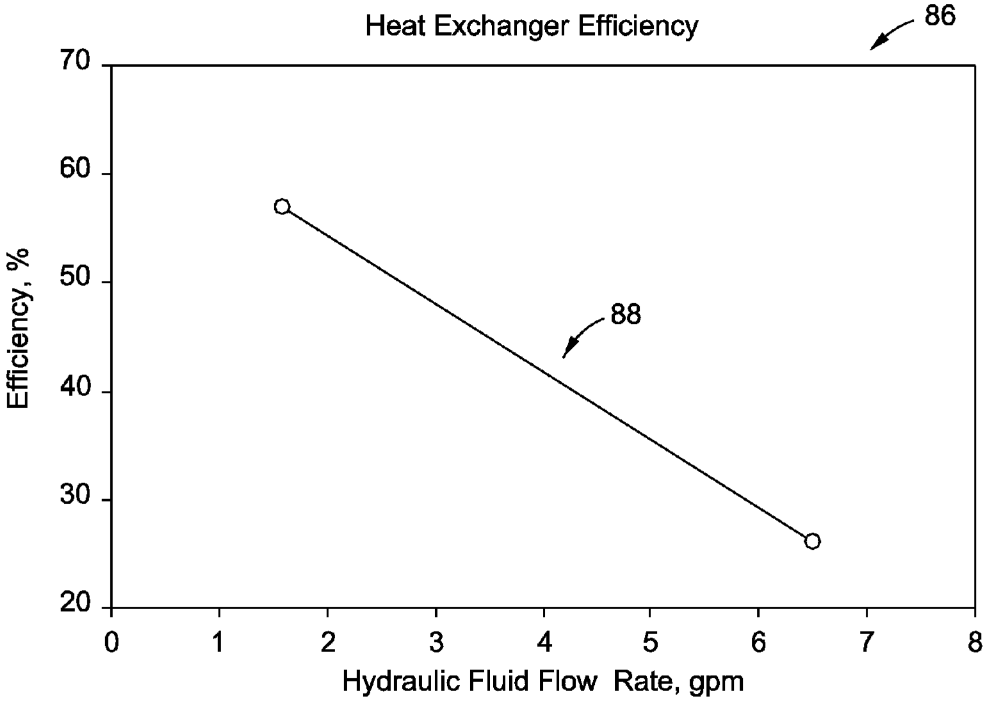
FIG. 7 is an illustration of a heat exchanger efficiency graph showing efficiency versus hydraulic fluid flow rate.

FIG. 7 is an illustration of a heat exchanger efficiency graph 86 showing efficiency in % (percent) of the heat exchanger versus hydraulic fluid flow rate in gpm (gallons per minute). FIG. 7 shows a hydraulic fluid flow rate-efficiency measurements plot line 88 indicating that as the hydraulic fluid flow rate increases, the efficiency of the heat exchanger decreases, and as the hydraulic fluid flow rate decreases, the heat exchanger efficiency increases. For example, as shown in FIG. 7, at a hydraulic fluid flow rate of about 1.5 gpm, the efficiency of the heat exchanger is about 58%, whereas at a hydraulic fluid flow rate of about 6.5 gpm, the efficiency of the heat exchanger is about 25%.

Due to the hydraulic fluid flow rate-efficiency measurements plot line 88 shown in FIG. 7, the flow control element 44 (see FIG. 2), such as in the form of pressure control valve 46 (see FIG. 2), has an open-close performance related to the hydraulic fluid temperature-pressure drop measurements plot line 84 shown in FIG. 6. The state of being opened or closed of the flow control element 44, such as in the form of pressure control valve 46, may result in a distinct variation of heat dissipation from the heat exchangers 40 into the fuel tank 42 (see FIG. 2). The heat exchanger efficiency may be calculated with the following formula: Efficiency=($T_{in}$ minus $T_{out}$)/($T_{in}$ minus $T_{fuel}$), where $T_{in}$ is the hydraulic fluid temperature at the heat exchanger inlet or entrance, $T_{out}$ is the hydraulic fluid temperature at the heat exchanger outlet or exit, and $T_{fuel}$ is the fuel temperature.

Figure 3:
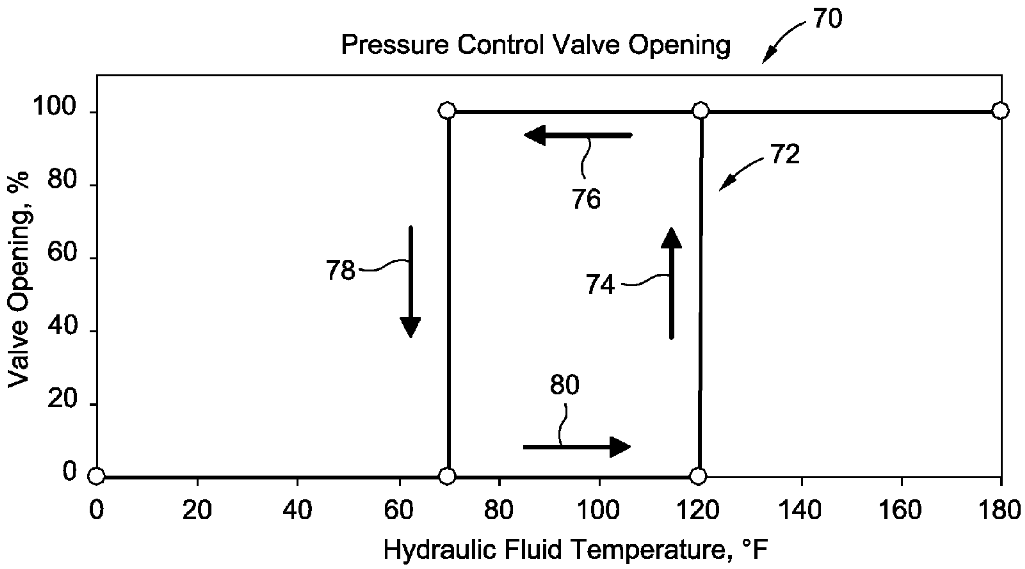
FIG. 3 is an illustration of a pressure control valve opening graph showing valve opening versus hydraulic fluid temperature.

Based on the heat exchanger characteristics shown in FIGS. 6 and 7, FIG. 3 shows an illustration of a pressure control valve opening graph 70 indicating (pressure control) valve opening in % (percent) versus hydraulic fluid temperature in ° F. (degrees Fahrenheit). FIG. 3 shows a nonlinear characteristic 72 representing the pressure control valve 46 (see FIG. 2) opening and closing in relation to the heat exchangers 40 (see FIG. 2) at a hydraulic fluid temperature in a range of about 70° F. to about 120° F. and a pressure control valve opening from 0% to 100%. Arrow 80, as shown in FIG. 3, indicates a temperature increase or heating up of the hydraulic fluid from 70° F. to about 120° F. Such temperature increase results in a pressure decrease or drop to allow the pressure control valve 46 (see FIG. 2) to open. When the temperature is increased, and the pressure drop is decreased, a spring 48 (see FIG. 2) in the pressure control valve 46 (see FIG. 2) overcomes a pressure to open the pressure control valve 46, so that the heat exchanger 40*b* (see FIG. 2) is connected and in use. Arrow 74, as shown in FIG. 3, indicates a (pressure control) valve opening increase from 0% to 100%. Such (pressure control) valve opening results in both heat exchangers 40 being connected and in use. Arrow 76, as shown in FIG. 3, indicates a temperature decrease or cooling of the hydraulic fluid from 120° F. to about 70° F. Such temperature decrease results in an increased pressure differential (across the filter 58 (see FIG. 2) and the heat exchangers 40*a*, 40*b* (see FIG. 2)), which overcomes the spring 48 in the pressure control valve 46 to close the pressure control valve 46 so the heat exchanger 40*b* is disconnected and not in use. Arrow 78, as shown in FIG. 3, indicates a (pressure control) valve opening decrease from 100% to 0%. Such (pressure control) valve opening decrease results in one heat exchanger 40*a* being preferably connected and in use and the other heat exchanger 40*b* being preferably disconnected and not in use.

As shown in FIG. 4, in another embodiment, the hydraulic fluid heat dissipation control assembly 28, such as hydraulic fluid heat dissipation control assembly 28*b*, has one flow control element 44, such as in the form of pressure control valve 46, and has three heat exchangers 40, such as heat exchanger 40*a* (HX), heat exchanger 40*b* (HX), and heat exchanger 40*c* (HX). The pressure control valve 46 senses a pressure differential between a case drain pressure (P) 33 (see FIG. 4) of a demand pump 38 (see FIG. 4) and a return flow line pressure (P) 53 (see FIG. 4), in order to control flow of the hydraulic fluid 32 through one or more of the three heat exchangers 40 and to control heat dissipation from the aircraft hydraulic system 26. In particular, as shown in FIG. 4, the flow control element 44, such as in the form of pressure control valve 46, may also sense other components in the case drain flow line 31, including sensing the pressure differential across the filter 58*b* and the heat exchanger 40*c* of the demand pump device 38, so the state of being opened or closed of the pressure control valve 46 is directly associated with a running condition of the demand pump device 38, for example, when the demand pump device 38 is "on" or "off". As a result, the pump condition with only the primary pump device 36 (see FIG. 4) running preferably has one heat exchanger 40, such as heat exchanger 40*a* or heat exchanger 40*b*, in effect. Thus, when the one or more pump devices 34 comprise one or more primary pump devices 36, and when only the one or more primary pump devices 36 are running, only one of the three heat exchangers 40 is operational. Further, the condition with both the primary pump device 36 and the demand pump device 38 running preferably has three heat exchangers 40, such as heat exchangers 40*a*, 40*b*, 40*c*, in effect. Thus, when the one or more pump devices 34 comprise one or more primary pump devices 36 and one or more demand pump devices 38, and when both of the one or more primary pump devices 36 and the one or more demand pump devices 38 are running, all three of the heat exchangers 40 are operational. Finally, when the one or more pump devices 34 comprise one or more demand pump devices 38, the pressure differential varies with a pump running condition of the one or more demand pump devices 38.

As shown in FIG. 5, in another embodiment of the hydraulic fluid heat dissipation control assembly 28, such as hydraulic fluid heat dissipation control assembly 28*c*, such embodiment shown in FIG. 5 is similar to the embodiment of the hydraulic fluid heat dissipation control assembly 28, such as hydraulic fluid heat dissipation control assembly 28*b*, shown in FIG. 4, except that the flow control element 44, such as in the form of pressure control valve 46, may be positioned or placed in a by-pass path 60 (see FIG. 5), so the pump condition with the primary pump device 36 running preferably has no heat exchanger 40 in effect, that is, neither heat exchanger 40*a* (see FIG. 5) nor heat exchanger 40*b* (see FIG. 5). Thus, when the one or more pump devices 34 comprise one or more primary pump devices 36, and when the hydraulic fluid heat dissipation control assembly 28 has one flow control element 44, such as pressure control valve 46, positioned in the by-pass path 60, a pump running condition of each of the one or more primary pump devices 36 has none of the two or more heat exchangers 40 in operation. The embodiment shown in FIG. 5 preferably benefits cold day operations in which additional heat may be required to warm up the hydraulic fluid of the aircraft hydraulic system 26.

Figure 8:
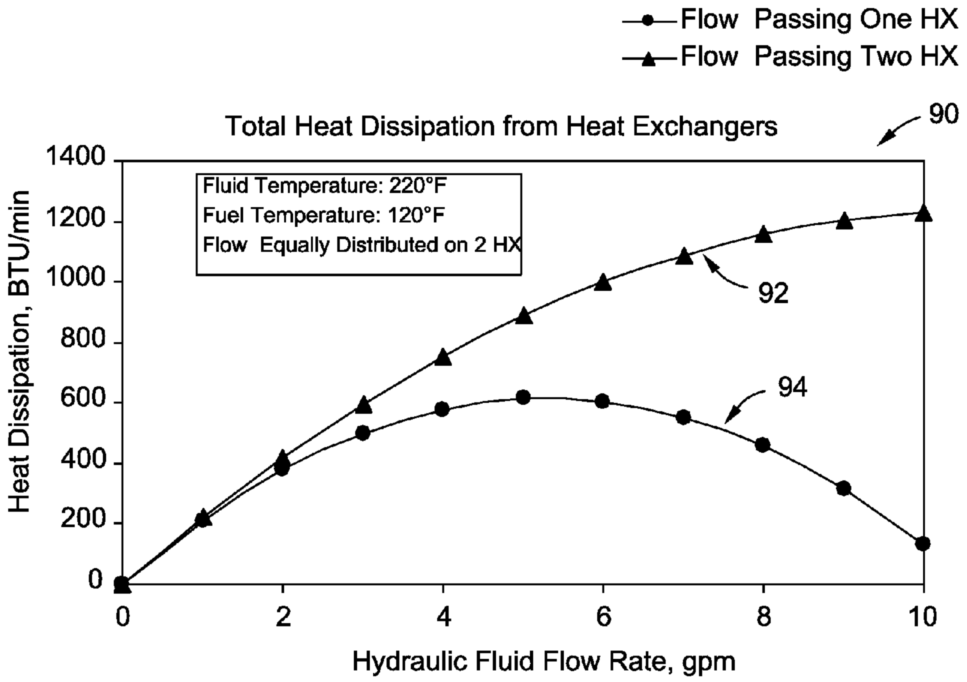
FIG. 8 is an illustration of a total heat dissipation from heat exchangers graph showing heat dissipation versus hydraulic fluid flow rate.

FIG. 8 is an illustration of a total heat dissipation from heat exchangers graph 90 showing heat dissipation in BTU/min (British thermal units per minute) versus hydraulic fluid flow rate in gpm (gallons per minute). FIG. 8 shows a hydraulic fluid flow passing through two heat exchangers-heat dissipation measurements plot line 92 and a hydraulic fluid flow passing through one heat exchanger-heat dissipation measurements plot line 94. The measurements for the hydraulic fluid flow passing through two heat exchangers-heat dissipation measurements plot line 92 and the hydraulic fluid flow passing through one heat exchanger-heat dissipation measurements plot line 94 were taken at a hydraulic fluid flow temperature of 220° F. (degrees Fahrenheit), a fuel temperature of 120° F. (degrees Fahrenheit), and a hydraulic fluid flow rate equally distributed on two heat exchangers positioned in parallel to each other. As shown in FIG. 8, at a hydraulic fluid flow rate of 1 gpm, the heat dissipation of the hydraulic fluid flow passing through one heat exchanger and the hydraulic fluid flow passing through two heat exchangers is the same at 200 BTU/min. Thus, there appears to be no difference between having one heat exchanger or two heat exchangers at a hydraulic fluid flow rate of 1 gpm. As further shown in FIG. 8, at a hydraulic fluid flow rate of 2 gpm, the heat dissipation of the hydraulic fluid flow passing through one heat exchanger is slightly less than 400 BTU/min, and the hydraulic fluid flow passing through two heat exchangers is slightly greater than 400 BTU/min. Thus, there starts to show a slight difference between having one heat exchanger or two heat exchangers at a hydraulic fluid flow rate of 2 gpm. As further shown in FIG. 8, at a hydraulic fluid flow rate of 3 gpm, the heat dissipation of the hydraulic fluid flow passing through one heat exchanger is about 500 BTU/min, and the hydraulic fluid flow passing through two heat exchangers is about 600 BTU/min. There, a benefit is shown with having two heat exchangers over one heat exchanger at a hydraulic fluid flow rate of 3 gpm. As further shown in FIG. 8, at a hydraulic fluid flow rate of 4 gpm, the heat dissipation of the hydraulic fluid flow passing through one heat exchanger is slightly less than 600 BTU/min, and the hydraulic fluid flow passing through two heat exchangers is slightly less than 800 BTU/min. Thus, a greater benefit is shown with having two heat exchangers over one heat exchanger at a hydraulic fluid flow rate of 4 gpm. As further shown in FIG. 8, at a hydraulic fluid flow rate of 5 gpm, the heat dissipation of the hydraulic fluid flow passing through one heat exchanger is about 600 BTU/min, and the hydraulic fluid flow passing through two heat exchangers is about 900 BTU/min. Thus, an even greater benefit is shown with having two heat exchangers over one heat exchanger at a hydraulic fluid flow rate of 5 gpm. As further shown in FIG. 8, at a hydraulic fluid flow rate of 6 gpm to 10 gpm, the hydraulic fluid flow passing through one heat exchanger starts to decrease from about slightly less than 600 BTU/min to slightly more than 100 BTU/min, while the hydraulic fluid flow passing through two heat exchangers continues to increase from 1000 BTU/min to 1200 BTU/min. Preferably, when there are at least two heat exchangers positioned in parallel to each other and used with two pump devices 34 (see FIG. 4), such as a primary pump device 36 and a demand pump device 38, the hydraulic fluid flow rate is 5 gpm to 8 gpm, which was found to exhibit a surprisingly beneficial total heat dissipation and hydraulic fluid flow for use in embodiments of the hydraulic fluid heat dissipation control assembly 28 of an aircraft hydraulic system 26.

Figure 9:
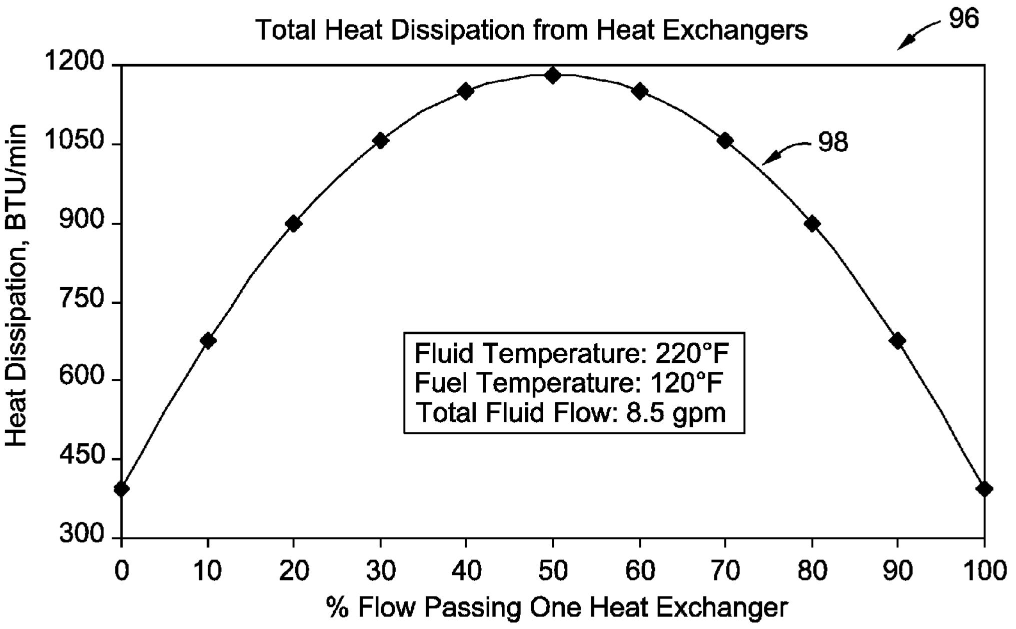
FIG. 9 is an illustration of a total heat dissipation from heat exchangers graph showing heat dissipation versus flow passing one heat exchanger; and, FIG. 10 is a flow diagram illustrating an exemplary method of the disclosure.

FIG. 9 is an illustration of a total heat dissipation from heat exchangers graph 96 showing heat dissipation in BTU/min (British thermal units per minute) versus percent (%) (hydraulic fluid) flow passing one heat exchanger where there are two heat exchangers positioned in parallel to each other. FIG. 9 shows a percent (hydraulic fluid) flow passing through one heat exchanger-heat dissipation measurements plot line 98. The measurements for the one heat exchanger-heat dissipation measurements plot line 98 were taken at a hydraulic fluid flow temperature of 220° F. (degrees Fahrenheit), a fuel temperature of 120° F. (degrees Fahrenheit), and a total fluid flow rate of 8.5 gpm. As shown in FIG. 9, if the percent hydraulic fluid flow passing one heat exchanger is 10% (the other heat exchanger would have a percent hydraulic fluid flow of 90%) or 90% (the other heat exchanger would have a percent hydraulic fluid flow of 10%), the heat dissipation is about 650 BTU/min for both. As further shown in FIG. 9, if the percent hydraulic fluid flow passing one heat exchanger is 50% (the other heat exchanger would have a percent hydraulic fluid flow of 50%), the heat dissipation is about 1200 BTU/min, which may be advantageously efficient. In addition, as further shown in FIG. 9, if the percent hydraulic fluid flow passing one heat exchanger is 40% (the other heat exchanger would have a percent hydraulic fluid flow of 60%), or 60% (the other heat exchanger would have a percent hydraulic fluid flow of 40%), the heat dissipation is about 1150 BTU/min, which may also be advantageously efficient. Preferably, when there are at least two identical heat exchangers positioned in parallel to each other and used with two pump devices 34 (see FIG. 4), such as a primary pump device 36 and a demand pump device 38, the percent hydraulic fluid flow passing one heat exchanger is between about 40% to about 60%, which was found to exhibit a surprisingly beneficial total heat dissipation and efficiency for use in embodiments of the hydraulic fluid heat dissipation control assembly 28 of an aircraft hydraulic system 26. The heat dissipation may be calculated with the following formula: Heat Dissipation=$(c_p\rho)\times(Q)\times(T_{in}$ minus $T_{out})$, where $c_p$ is specific heat, ρ is hydraulic fluid density, Q is hydraulic fluid flow rate, $T_{in}$ is the hydraulic fluid temperature at the heat exchanger inlet or entrance, and $T_{out}$ is the hydraulic fluid temperature at the heat exchanger outlet or exit.

Thus, the pressure differential across the heat exchanger 40 may be used through a pressure control valve 46 to control the hydraulic fluid flow through the heat exchangers 40, so as to vary the heat dissipation from the aircraft hydraulic system 26. With respect to the hydraulic fluid heat dissipation control assembly 28*a* of FIG. 2, the pressure differential across the heat exchanger 40 varies with the hydraulic fluid temperature due to hydraulic fluid viscosity changes with the temperature, in order to achieve controlled heat dissipation based on the fluid temperature. As discussed above with respect to the hydraulic fluid heat dissipation control assemblies 28*b*, 28*c* of FIGS. 4 and 5, respectively, the pressure differential also changes with the hydraulic fluid flow passing through the heat exchanger but due to the resistance associated with the hydraulic fluid flow, in order to control the heat dissipation based on pump running conditions.

In another embodiment of the disclosure, there is provided an aircraft 10 (see FIG. 1) having an aircraft hydraulic system 26 (see FIG. 1) with a hydraulic fluid heat dissipation control assembly 28 (see FIG. 1). The aircraft 10 comprises a fuselage 12, a pair of wings 18 operatively coupled to the fuselage 12, and an aircraft hydraulic system 26 disposed within at least one of the fuselage 12 and the wings 18. The aircraft hydraulic system 26 comprises a hydraulic fluid heat dissipation control assembly 28 (see FIG. 1). The hydraulic fluid heat dissipation control assembly 28 comprises at least one fluid flow line 30, such as in the form of case drain flow line 31 (see FIGS. 2, 4, 5). The hydraulic fluid heat dissipation control assembly 28 further comprises one or more pump devices 34 (see FIGS. 2, 4, 5) coupled to the at least one fluid flow line 30, such as in the form of case drain flow line 31. The hydraulic fluid heat dissipation control assembly 28 further comprises one or more heat exchangers 40 (see FIGS. 2, 4, 5) coupled to the at least one fluid flow line 30, such as in the form of case drain flow line 31 (see FIGS. 2, 4, 5). The hydraulic fluid heat dissipation control assembly 28 further comprises at least one pressure control valve 46 (see FIGS. 2, 4, 5) coupled to the at least one fluid flow line 30, such as in the form of case drain flow line 31. The pressure control valve 46 controls flow and heat dissipation of the hydraulic fluid 32 (see FIGS. 2, 4, 5) from the one or more pump devices 34 through the at least one fluid flow line 30, such as in the form of case drain flow line 31, and through the one or more heat exchangers 40 in order to obtain a heat dissipation controlled hydraulic fluid 50 (see FIGS. 2, 4, 5). The heat dissipation controlled hydraulic fluid 50 then flows to the return flow line 52 (see FIGS. 2, 4, 5) or to the hydraulic fluid reservoir 54 (see FIGS. 2, 4, 5) which are both located in the aircraft hydraulic system 26. Specific embodiments of the hydraulic fluid heat dissipation control assembly 28 that may be installed in the aircraft hydraulic system 26 of the aircraft 10 (see FIG. 1) are discussed in detail above.

Figure 10:
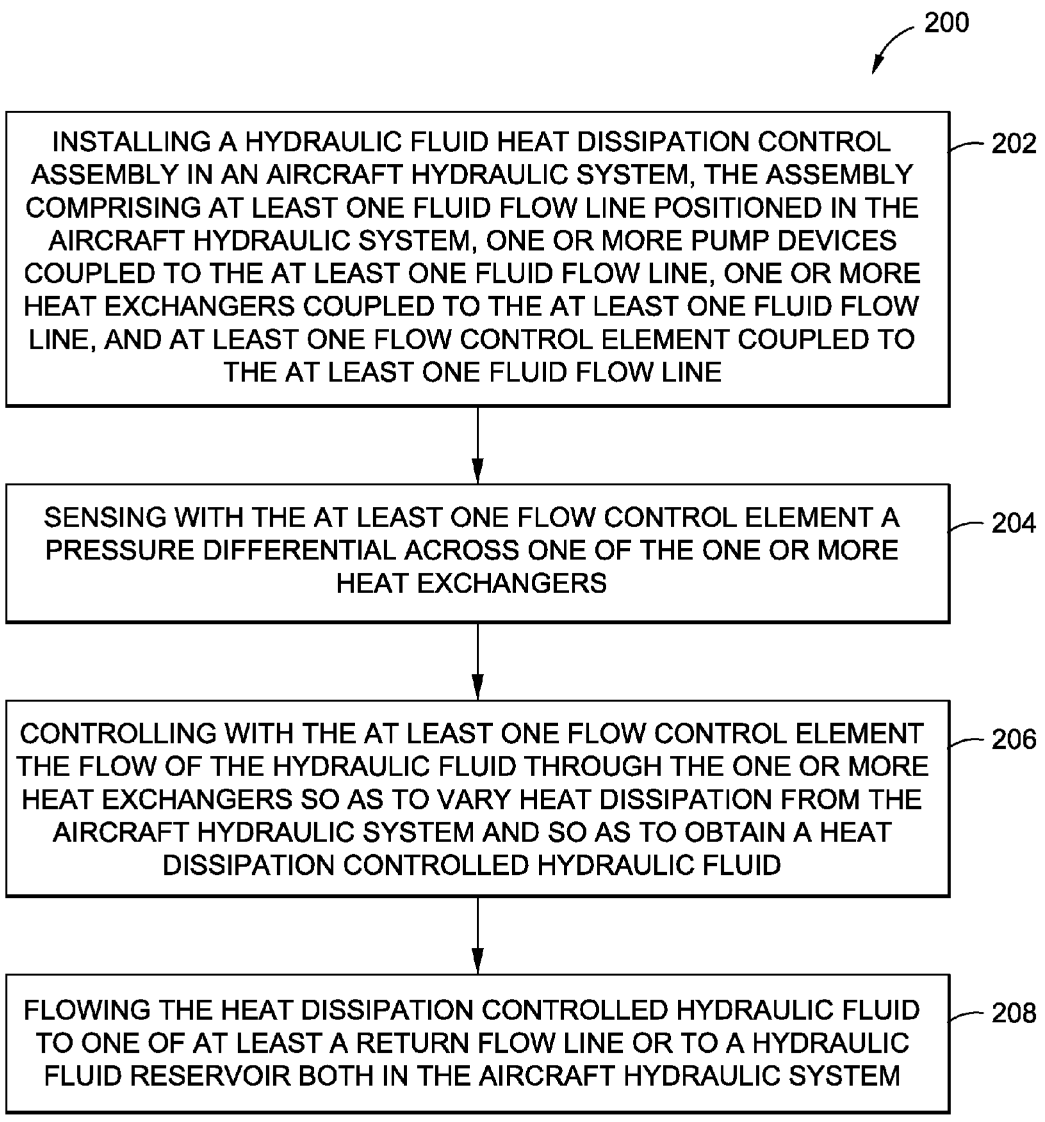

In another embodiment of the disclosure, as shown in FIG. 10, there is provided a method 200 of controlling heat dissipation of a hydraulic fluid 32 (see FIGS. 2, 4, 5) in an aircraft hydraulic system 26 (see FIGS. 2, 4, 5). FIG. 10 is a flow diagram illustrating an exemplary method 200 of the disclosure.

As shown in FIG. 10, the method 200 comprises step 202 of installing a hydraulic fluid heat dissipation control assembly 28 (see FIGS. 2, 4, 5) in an aircraft hydraulic system 26 (see FIG. 1). The method 200 controls heat dissipation of a hydraulic fluid 32 (see FIGS. 2, 4, 5) in the aircraft hydraulic system 26 to condition the hydraulic fluid 32 to maintain an optimum hydraulic fluid temperature, such that the hydraulic fluid 32 is not overheated for hot day operations or conditions and such that the hydraulic fluid 32 retains heat to ensure adequate hydraulic performance for cold day operations or conditions.

The hydraulic fluid heat dissipation control assembly 28 used in the method 200 comprises at least one fluid flow line 30 (see FIGS. 2, 4, 5) positioned in the aircraft hydraulic system 26. The at least one fluid flow line 30 preferably comprises a case drain flow line 31 (see FIGS. 2, 4, 5). The hydraulic fluid heat dissipation control assembly 28 further comprises one or more pump devices 34 (see FIGS. 2, 4, 5) coupled to the at least one fluid flow line 30. The one or more pump devices 34 may comprise, for example, one or more primary pump devices 36 (see FIGS. 4, 5), one or more demand pump devices 38 (see FIGS. 4, 5), or another suitable pump device 34. FIG. 2 shows one pump device 34 which may comprise either one primary pump device 36 or one demand pump device 38. FIGS. 4 and 5 show two pump devices 34 comprising one primary pump device 36 and one demand pump device 38.

The hydraulic fluid heat dissipation control assembly 28 further comprises one or more heat exchangers 40 coupled to the at least one fluid flow line 30. The one or more heat exchangers 40 are preferably located in one or more fuel tanks 42, for example, either together in one fuel tank 42 or separately in two or more fuel tanks 42. In one embodiment, as shown in FIG. 2, the hydraulic fluid heat dissipation control assembly 28 may have two heat exchangers 40 positioned in parallel to each other in one fuel tank 42. In another embodiment, as shown in FIG. 5, the hydraulic fluid heat dissipation control assembly 28 may have two heat exchangers 40*a*, 40*b*, with one heat exchanger 40*a* located in one fuel tank 42*a*, and with the other heat exchanger 40*b* located in another fuel tank 42*b*. In another embodiment, as shown in FIG. 4, the hydraulic fluid heat dissipation control assembly 28 may have three heat exchangers 40*a*, 40*b*, 40*c*, with heat exchangers 40*a*, 40*b* positioned in parallel to each other in fuel tank 42*a*, and heat exchanger 40*c* located in fuel tank 42*b*.

The hydraulic fluid heat dissipation control assembly 28 further comprises at least one flow control element 44 (see FIGS. 2, 4, 5) coupled to the at least one fluid flow line 30. Preferably, the at least one flow control element 44 comprises a pressure control valve 46 (see FIGS. 2, 4, 5). FIGS. 2, 4, and 5 each show one flow control element 44 in the form of pressure control valve 46. However, additional flow control elements 44 may also be used.

As shown in FIGS. 2, 4 and 5, the hydraulic fluid heat dissipation control assembly 28 may further comprise a pressure line 56 coupled to the return flow line 52 via the one or more pump devices 34. The hydraulic fluid heat dissipation control assembly 28 may further comprise one or more filters 58 (see FIGS. 2, 4, 5). Specific embodiments of the hydraulic fluid heat dissipation control assembly 28 that may be used in the method 200 are discussed in detail above.

The method 200 further comprises step 204 of sensing with the at least one flow control element 44 a pressure differential across one or at least one of the one or more heat exchangers 40. In one embodiment, as shown in FIG. 2, for the sensing step 204 of the method 200, the pressure differential varies with a temperature of the hydraulic fluid 32. In other embodiments, as shown in FIGS. 4, 5, for the sensing step 204, the one or more pump devices 34 comprise one or more demand pump devices 36, and the pressure differential varies with a pump running condition of the one or more demand pump devices 36. In one embodiment of the method 200, as shown in FIG. 5, the one or more pump devices 34 comprise one or more primary pump devices 36, and the hydraulic fluid heat dissipation control assembly 28 has one flow control element 44 positioned in a by-pass path 60 (see FIG. 5), so that a pump running condition of each of the one or more primary pump devices 36 has none of the one or more heat exchangers 40 in operation.

The method 200 further comprises step 206 of controlling with the at least one flow control element 44 the flow of the hydraulic fluid 32 through the two or more heat exchangers 40 so as to vary heat dissipation from the aircraft hydraulic system 26 and so as to obtain a heat dissipation controlled hydraulic fluid 50 (see FIGS. 2, 4, 5). The method 200 further comprises step 208 of flowing the heat dissipation controlled hydraulic fluid 50 to one of at least the return flow line 52 (see FIGS. 2, 4, 5) or to the hydraulic fluid reservoir 54 (see FIGS. 2, 4, 5) which are both located in the aircraft hydraulic system 26.

Embodiments of the hydraulic fluid heat dissipation control assembly 28 (see FIGS. 2, 4, 5) and method 200 (see FIG. 10) for an aircraft hydraulic system 26 allow for controlled heat dissipation through a pressure differential which varies with fluid temperature or pump running conditions and is convenient to be sensed. In addition, embodiments of the hydraulic fluid heat dissipation control assembly 28 (see FIGS. 2, 4, 5) and method 200 (see FIG. 10) provide a way to control the heat dissipation so the operational limitations or restrictions associated with known solutions of “no heat exchanger” or “heat exchanger with fixed effect” may be eliminated. Further, embodiments of the hydraulic fluid heat dissipation control assembly 28 (see FIGS. 2, 4, 5) and method 200 (see FIG. 10) for an aircraft hydraulic system 26 control the heat dissipation from an aircraft hydraulic system 26, so the hydraulic fluid 32 preferably will not be overheated for hot day operations or conditions, and the hydraulic fluid 32 in the aircraft hydraulic system 26 preferably will retain heat to ensure adequate hydraulic performance for cold day operations or conditions. This may result in less operation restrictions as hydraulic fluid temperature related restrictions for cold day and hot day operations or conditions may be eliminated. This may further result in performance improvement as warmer hydraulic fluid temperature may result in better hydraulic performance for cold day operations or conditions.

In addition, embodiments of the hydraulic fluid heat dissipation control assembly 28 (see FIGS. 2, 4, 5) and method 200 (see FIG. 10) for an aircraft hydraulic system 26 provide for controlling hydraulic heat dissipation, for flowing the hydraulic fluid 32 to at least one fluid flow line 30 (see FIGS. 2, 4, 5), such as in the form of a case drain flow line 31 (see FIGS. 2, 4, 5) from one or more pump devices 34 (see FIGS. 2, 4, 5) to condition the hydraulic fluid 32 in the aircraft hydraulic system 26 and more effectively maintain an optimum hydraulic fluid temperature.

Finally, embodiments of the hydraulic fluid heat dissipation control assembly 28 (see FIGS. 2, 4, 5) and method 200 (see FIG. 10) for an aircraft hydraulic system 26 may provide such benefits as removing various restrictions on operating aircraft in high temperatures, lowering system weight by optimization of the design, such as by sizing aircraft hydraulic systems at an elevated fluid temperature to reduce hydraulic tubing sizes, and reducing costs such as by eliminating expensive and long lead times to develop a thermostat control valve. Moreover, the hydraulic fluid heat dissipation control assembly 28 and method 200 may further reduce costs by utilizing existing, low cost components, e.g., heat exchangers, pressure control valve, and hydraulic tubing for the fluid flow lines. Finally, the performance of the hydraulic fluid heat dissipation control assembly 28 may be more reliable than known assemblies and systems and preferably requires no maintenance in service as compared to known thermostat control systems.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A hydraulic fluid heat dissipation control assembly for an aircraft hydraulic system, the hydraulic fluid heat dissipation control assembly comprising:

two heat exchangers positioned in parallel to each other;

at least one fluid flow line coupled to the two heat exchangers;

a filter coupled to the at least one fluid flow line; and, a pressure control valve positioned in line with one of the two heat exchangers, the pressure control valve configured to sense a pressure differential across the filter and the two heat exchangers to control flow of a hydraulic fluid through the two heat exchangers, so as to control heat dissipation from the aircraft hydraulic system.

2. The assembly of claim 1 wherein the at least one fluid flow line comprises a case drain flow line.

3. The assembly of claim 1 further comprising one or more pump devices coupled to the at least one fluid flow line.

4. The assembly of claim 3 wherein the pressure control valve controls flow and heat dissipation of the hydraulic fluid from the one or more pump devices through the at least one fluid flow line and through the two heat exchangers, in order to obtain a heat dissipation controlled hydraulic fluid which then flows to a return flow line or to a hydraulic fluid reservoir both located in the aircraft hydraulic system.

5. The assembly of claim 4 wherein a pressure line is coupled to the return flow line via the one or more pump devices.

6. The assembly of claim 1 wherein the pressure differential varies with a temperature of the hydraulic fluid.

7. A hydraulic fluid heat dissipation control assembly for an aircraft hydraulic system, the hydraulic fluid heat dissipation control assembly comprising:

two or more heat exchangers with at least two of the two or more heat exchangers positioned in parallel to each other;

at least one fluid flow line coupled to the two or more heat exchangers;

a filter coupled to the at least one fluid flow line; and, a pressure control valve positioned in line with one of the two or more heat exchangers, the pressure control valve configured to sense a pressure differential across the filter and the one of the two or more heat exchangers to control flow of a hydraulic fluid through the two or more heat exchangers, so as to control heat dissipation from the aircraft hydraulic system.

8. The assembly of claim 7 wherein the two or more heat exchangers comprise three heat exchangers.

9. The assembly of claim 7 further comprising one or more pump devices coupled to the at least one fluid flow line.

10. The assembly of claim 7 further comprising one or more demand pump devices, wherein the pressure differential varies with a pump running condition of each of the one or more demand pump devices.

11. The assembly of claim 8 further comprising one or more primary pump devices, wherein when only the one or more primary pump devices are running, only one of the three heat exchangers is operational.

12. The assembly of claim 8 further comprising one or more primary pump devices and one or more demand pump devices, wherein when both of the one or more primary pump devices and the one or more demand pump devices are running, all three of the heat exchangers are operational.

13. An aircraft having an aircraft hydraulic system with a hydraulic fluid heat dissipation control assembly, the aircraft comprising:

a fuselage;

a pair of wings operatively coupled to the fuselage;

one or more aircraft hydraulic systems disposed within at least one of the fuselage and the pair of wings, each aircraft hydraulic system comprising:

a hydraulic fluid heat dissipation control assembly comprising:

at least one fluid flow line;

a filter coupled to the at least one fluid flow line;

one or more pump devices coupled to the at least one fluid flow line;

two heat exchangers positioned in parallel to each other and coupled to the at least one fluid flow line; and, a pressure control valve positioned in line with one of the two heat exchangers, the pressure control valve configured to sense a pressure differential across the filter and the two heat exchangers to control flow of a hydraulic fluid from the one or more pump devices through the at least one fluid flow line and through the two heat exchangers in order to control heat dissipation from the aircraft hydraulic system and to obtain a heat dissipation controlled hydraulic fluid, which then flows to a return flow line or to a hydraulic fluid reservoir both located in the aircraft hydraulic system.

14. The aircraft of claim 13 wherein a pressure line is coupled to the return flow line via the one or more pump devices.

15. The aircraft of claim 13 wherein the at least one fluid flow line comprises a case drain flow line.

16. The aircraft of claim 13 wherein the pressure differential varies with a temperature of the hydraulic fluid.

17. An aircraft having an aircraft hydraulic system with a hydraulic fluid heat dissipation control assembly, the aircraft comprising:

a fuselage;

a pair of wings operatively coupled to the fuselage;

one or more aircraft hydraulic systems disposed within at least one of the fuselage and the pair of wings, each aircraft hydraulic system comprising:

a hydraulic fluid heat dissipation control assembly comprising:

at least one fluid flow line;

a filter coupled to the at least one fluid flow line;

one or more pump devices coupled to the at least one fluid flow line;

two or more heat exchangers with at least two of the two more heat exchangers positioned in parallel to each other, and coupled to the at least one fluid flow line; and, a pressure control valve positioned in line with one of the two heat exchangers, the pressure control valve configured to sense a pressure differential across the filter and the one of the two or more heat exchangers to control flow of a hydraulic fluid from the one or more pump devices through the at least one fluid flow line and through the two or more heat exchangers in order to control heat dissipation from the aircraft hydraulic system and to obtain a heat dissipation controlled hydraulic fluid, which then flows to a return flow line or to a hydraulic fluid reservoir both located in the aircraft hydraulic system.

18. The aircraft of claim 17 wherein the two or more heat exchangers comprise three heat exchangers with two of the three heat exchangers positioned in parallel to each other.

19. The aircraft of claim 17 wherein the pressure differential varies with a pump running condition of the one or more pump devices.

20. The aircraft of claim 18 wherein each of the one or more pump devices is in the form of a primary pump device, and when only each primary pump device is running, only one of the three heat exchangers is operational.

21. The aircraft of claim 18 wherein each of the one or more pump devices is in the form of one of a primary pump device, and a demand pump device, and when both of each of the primary pump devices and each of the demand pump devices are running, all three of the heat exchangers are operational.

22. A method of controlling heat dissipation of a hydraulic fluid in an aircraft hydraulic system, the method comprising:

installing a hydraulic fluid heat dissipation control assembly in an aircraft hydraulic system, the hydraulic fluid heat dissipation control assembly comprising:

at least one fluid flow line;

a filter coupled to the at least one fluid flow line;

one or more pump devices coupled to the at least one fluid flow line;

two heat exchangers positioned in parallel to each other and coupled to the at least one fluid flow line; and, a pressure control valve positioned in line with one of the two heat exchangers;

sensing with the pressure control valve a pressure differential across the filter and the two heat exchangers;

controlling with the pressure control valve, the flow of the hydraulic fluid through the two heat exchangers, so as to vary heat dissipation from the aircraft hydraulic system and so as to obtain a heat dissipation controlled hydraulic fluid; and, flowing the heat dissipation controlled hydraulic fluid to one of at least a return flow line or to a hydraulic fluid reservoir both in the aircraft hydraulic system.

23. The method of claim 22 wherein for the sensing step, the pressure differential varies with a temperature of the hydraulic fluid.

24. The method of claim 22 wherein for the sensing step, the pressure differential varies with a pump running condition of the one or more pump devices.

25. A hydraulic fluid heat dissipation control assembly for an aircraft hydraulic system, the hydraulic fluid heat dissipation control assembly comprising:

two heat exchangers;

a fluid flow line coupled to one of the two heat exchangers;

a filter coupled to the fluid flow line:

one or more pumps devices coupled to the fluid flow line; and, a pressure control valve positioned in a bypass path;

the pressure control valve configured to sense a pressure differential across the filter and the one of the two heat exchangers, to selectively bypass the other of the two heat exchangers, so as to control heat dissipation from the aircraft hydraulic system.

26. An aircraft having an aircraft hydraulic system with a hydraulic fluid heat dissipation control assembly, the aircraft comprising a fuselage:

a pair of wings operatively coupled to the fuselage:

one or more aircraft hydraulic systems disposed within at least one of the fuselage and the pair of wings, each aircraft hydraulic system comprising:

a hydraulic fluid heat dissipation control assembly comprising:

a fluid flow line;

a filter coupled to the fluid flow line:

one or more pumps devices coupled to the fluid flow line;

two heat exchangers, with one of the two heat exchangers coupled to the fluid flow line; and, a pressure control valve positioned in a bypass path;

the pressure control valve configured to sense a pressure differential across the filter and the one of the two heat exchangers, to selectively bypass the other of the two heat exchangers, in order to control heat dissipation from the aircraft hydraulic system and to obtain a heat dissipation controlled hydraulic fluid, which then flows to a return flow line or to a hydraulic fluid reservoir, both located in the aircraft hydraulic system.

27. A method of controlling heat dissipation of a hydraulic fluid in an aircraft hydraulic system, the method comprising:

installing a hydraulic fluid heat dissipation control assembly in an aircraft hydraulic system, the hydraulic fluid heat dissipation control assembly comprising:

a fluid flow line;

a filter coupled to the fluid flow line:

one or more pump devices coupled to the fluid flow line;

two heat exchangers, with one of the two heat exchangers coupled to the fluid flow line; and, a pressure control valve positioned in a bypass line;

sensing with the pressure control valve a pressure differential across the filter and the one of the two heat exchangers, to selectively bypass the other of the two heat exchangers, so as to control heat dissipation from the aircraft hydraulic system and so as to obtain a heat dissipation controlled hydraulic fluid; and, flowing the heat dissipation controlled hydraulic fluid to one of at least a return flow line or to a hydraulic fluid reservoir, both in the aircraft hydraulic system.

* * * * *